United States Patent Office 3,534,410
Patented Oct. 20, 1970

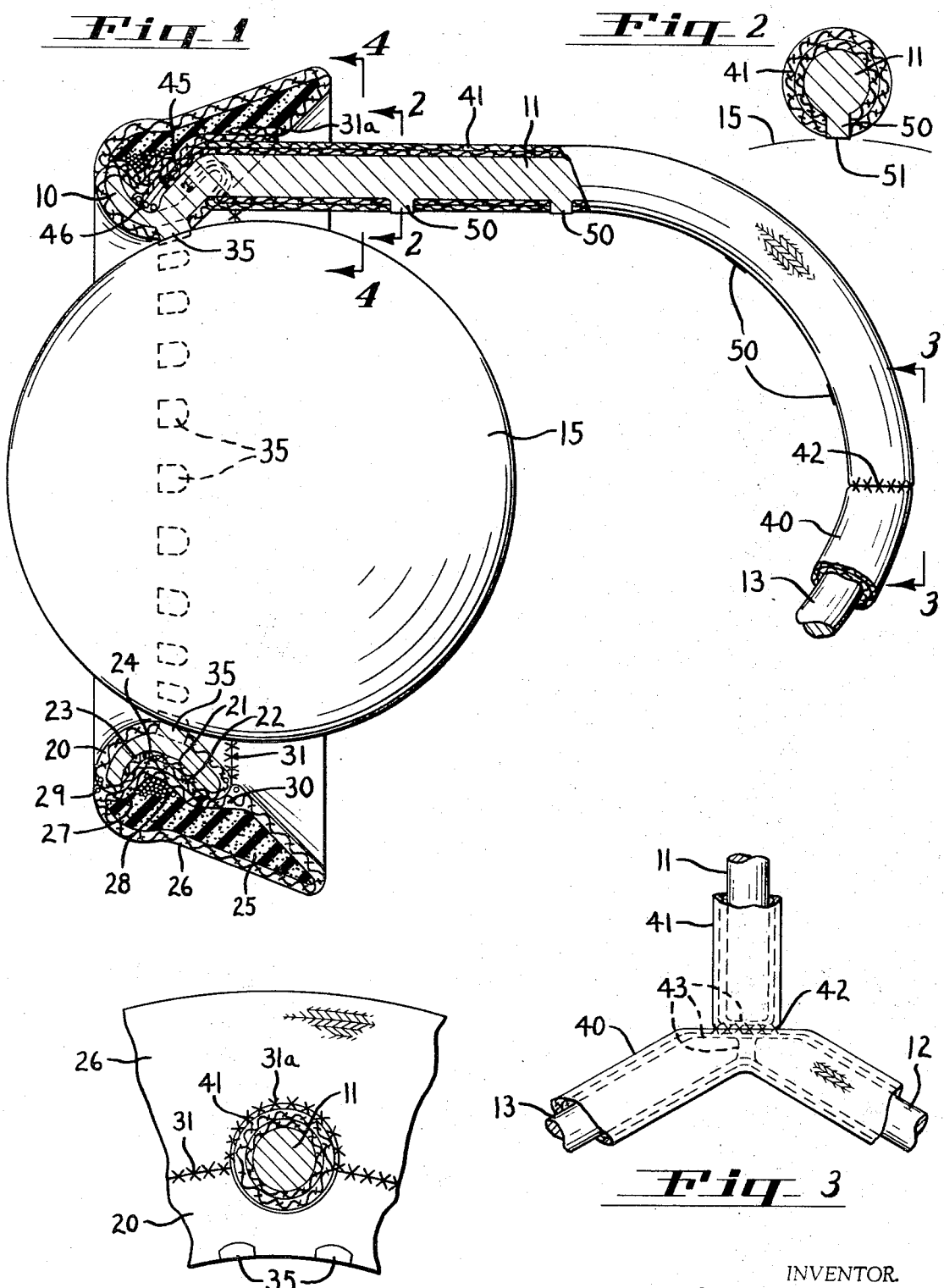

3,534,410
CLOTH COVERED HEART VALVE WITH COMPOSITE MATERIALS IN THE AREAS OF BALL CONTACT
Donald A. Raible, Corona, Calif., assignor to Edwards Laboratories, Inc., Santa Ana, Calif., a corporation of California
Continuation-in-part of application Ser. No. 650,852, July 3, 1967. This application Oct. 7, 1968, Ser. No. 765,304
Int. Cl. A61f 1/22
U.S. Cl. 3—1                                         16 Claims

ABSTRACT OF THE DISCLOSURE

A ball valve with cloth covered metal or plastic orifice ring and cage parts having protuberances extending through the cloth covering in the areas of ball contact in the ring and cage to protect the cloth. The protuberances in the orifice ring form rigid bearing surfaces for the ball allowing a large orifice area for a given size of ball. In one embodiment the orifice diameter is slightly in excess of the ball diameter.

CROSS REFERENCES TO RELATED APPLICATIONS

This application is a continuation-in-part of Ser. No. 650,852, for Heart Valve With Plastic Covered Cage Legs, filed July 3, 1967, and relates to a further development of a concept disclosed and claimed in co-pending application Ser. No. 587,806, for Heart Valve Prosthesis Having A Cloth Covered Body, filed Oct. 19, 1966 now Pat. No. 3,466,671, which is assigned to the assignee of the instant application.

BACKGROUND OF THE INVENTION

This invention relates to heart valves having cloth covered orifice ring and cage parts.

The purpose of the cloth covering is to reduce noise and wear on the valve member when a metal valve member is used and to anchor the invading tissue which tends to grow over the foreign body as explained in the co-pending applications referred to above. The diameter of the orifice is limited however by reason of the yieldability and wear of the cloth covered ball seating surface. The orifice diameter must be such that the ball cannot possibly pass through the orifice. The effective opening in a cloth covered orifice ring must, therefore, be somewhat less than can be tolerated in a rigid seating ring. It is desirable to have the orifice as large as possible in order to minimize the resistance to the flow of blood through the valve.

Also in the prior applications the characteristics of the cloth covering on the orifice ring must be selected with due consideration to structural integrity and resistance to wear from the ball in long term operation. A cloth suitable for a ball seat may not have an ideal biological surface in regard to such qualities as thinness of material, porosity, type of material, etc. Mechanical considerations compromise the biological considerations.

Objects of the present invention are, therefore, to provide an improved cloth covered heart valve, to provide a cloth covered heart valve having greater durability, to provide a cloth covered heart valve having a larger orifice for a given ball size, to provide a valve in which biological considerations may predominate over structural considerations in the selection of covering material, to provide a valve having a covering of relatively soft material and durable bearing surfaces for the valve member arranged to protect the soft covering and to provide a valve of the type described having an orifice diameter as large as the ball diameter.

SUMMARY OF THE INVENTION

The present form of construction involves a new concept to increase heart valve durability and allow for larger orifice areas with a given ball size while maintaining the desirable characteristics of a cloth covered prosthesis. The orifice ring and cage parts have protuberances extending through the thickness of the cloth covering to support the ball in all positions within its range of movement. Such protuberances prevent wear on the cloth whereby structural considerations do not enter into the selection of material for the cloth. A cloth having optimum biological qualities may be used without serious compromise to obtain outstanding structural qualities in the composite construction. The provision of rigid seating surfaces in the closed position of the ball allows a relatively large orifice area in relation to ball size. In one embodiment the orifice diameter is as large as the ball diameter.

Additional objects and advantages will become apparent and the invention will be better understood with reference to the following description of certain preferred embodiments illustrated in the accompanying drawings. Various changes may be made, however, in the details of construction and arrangement of parts and certain features may be used without others. All such modifications are included in the invention.

BRIEF DESCRIPTION OF THE DRAWINGS

FIG. 1 is a sectional view with parts broken away showing a heart valve embodying the features of the invention;
FIG. 2 is a view on the line 2—2 in FIG. 1;
FIG. 3 is a view on the line 3—3 in FIG. 1;
FIG. 4 is a view on the line 4—4 in FIG. 1.

DESCRIPTION OF THE PREFERRED EMBODIMENTS

Figure 5:
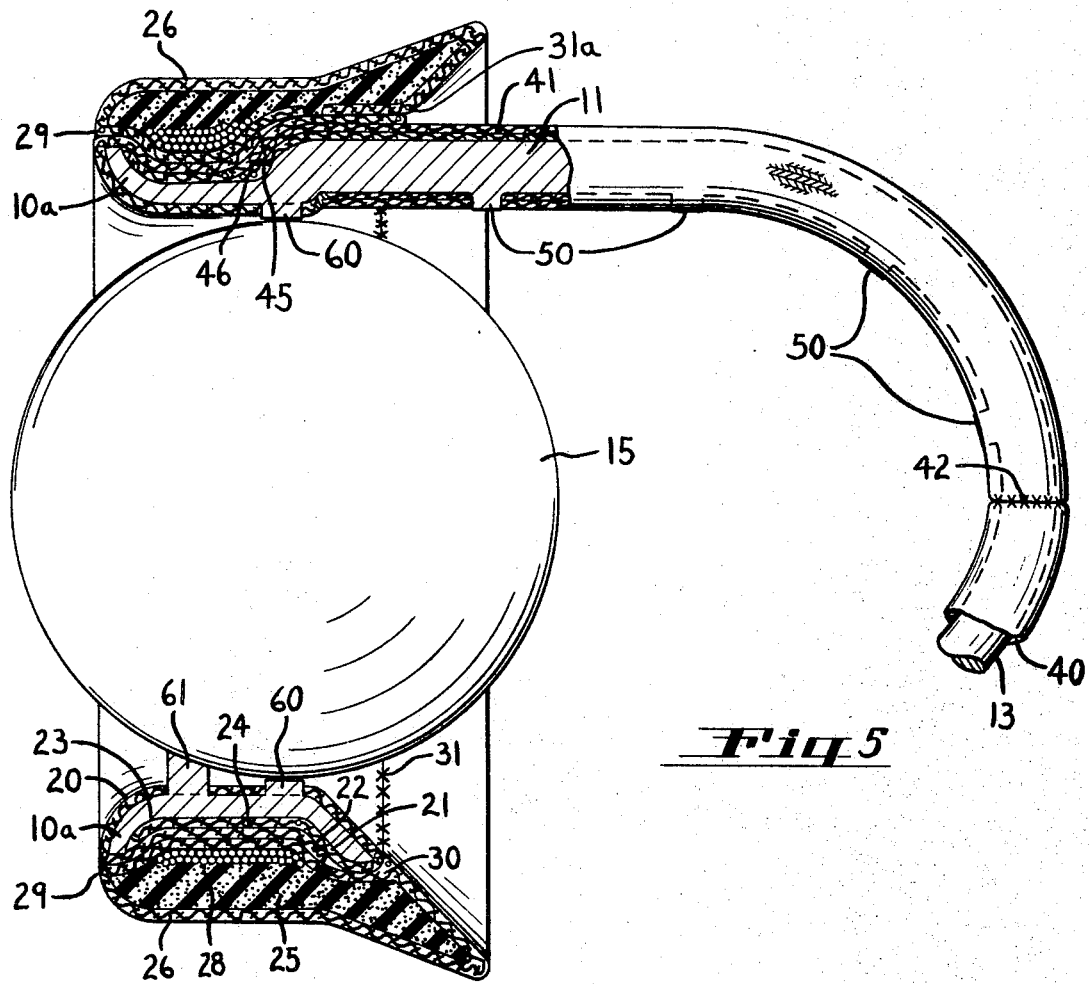
FIG. 5 is a view similar to FIG. 1 showing a modification, this view being taken on the line 5—5 in FIG. 6.

In FIGS. 1 to 4 the valve has an orifice ring 10 with a plurality of integral cage legs 11, 12 and 13 for retaining the ball 15. The orifice ring and cage legs may be cast from a suitable metal or molded from a suitable plastic. Ball 15 is preferably of hollow metal construction. The invention is not limited however to a metal valve member nor to a valve member of any particular shape.

Orifice ring 10 is covered by a soft material which is preferably porous, such as a plastic cloth. A first tubular cloth sleeve 20 has its opposite end portions 21 and 22 folded over the edges of the ring and overlapped in an outwardly facing groove or channel 23 of ring 10. End portion 21 is split to straddle the cage legs and equipped with a plastic draw string 24 to secure this end of the sleeve in the channel during assembly. A cushion ring 25 of soft, suturable material such as silicone foam rubber or Teflon felt is enfolded in a second cloth sleeve 26. The shape of cushion ring 25 depends upon the position in the heart where the valve is to be used. A suitable shape for an aorta valve is shown but a different shape may be used for other valve positions such as the mitral position.

Sleeve 26 has one end portion 27 overlying the end portions 21 and 22 of sleeve 20, these three sleeve end portions being secured in channel 23 by a winding 28 of suitable material such as plastic thread. Adjoining portions of sleeves 20 and 26 on the inflow face of the orifice ring are stitched together at 29. The opposite end 30 of sleeve 26 is tucked under a portion of cushion ring 25 and stitched at 31 to sleeve 20 on the outflow face of the valve. Cushion ring 25 and sleeve 26 thereby form a sewing or suturing ring, or cuff, for securing the valve to living tissue when the valve is implanted in a heart. The structure thus far described is similar to that shown in the above mentioned prior patent applications.

A new feature in the present construction comprises a circle of protuberances 35 which are integral with orifice ring 10. These protuberances project inward from ring 10 a distance equal to the thickness of sleeve 20 and have spherically curved exposed bearing surfaces to fit the surface of ball 15 when the ball is seated on these surfaces in closed position as shown in FIG. 1. Protuberances 35 are small enough to project through the mesh of the cloth of sleeve 20 so that the seating faces of the protuberances are not covered by the cloth.

The cloth is preferably a knitted fabric in which the threads are easily displaced on opposite sides of each protuberance 35. Thus the cloth is in contact with the ball in the spaces between the protuberances to seal the orifice when the ball is seated on the protuberances but the cloth is not subject to wear because the protuberances hold the ball out of pressure contact with the cloth. Since the protuberances 35 provide rigid seating surfaces for the ball, the orifice may be larger in relation to the ball diameter than in the prior patent applications referred to above where the cloth is compressed and subject to wear under the seating pressure of the ball. The light contact of the cloth against the ball between the protuberances tends to silence the sound of the impact and render the valve more quiet in operation than a valve having a metal ball and an uncovered metal orifice ring.

The cage legs 11, 12 and 13 are covered by two sleeves 40 and 41 which are also preferably of knitted cloth construction and preferably of double thickness as shown. In order to assemble the sleeves on the cage legs the legs are preferably separated from each other at the apex of the cage as shown in FIG. 3. This arrangement also allows one of the cage legs to be sprung elastically to one side for assembling the ball in the cage and allows the two legs 12 and 13 to be covered by the single sleeve 40. The other cage leg 11 is covered by a separate sleeve 41 which is stitched at 42 to the sleeve 40.

The cage legs have flat interfitting end surfaces 43 which substantially abut each other at the apex whereby the free ends stabilize each other and prevent the legs from bending inwardly toward each other in the event of rough handling. The interconnection of the two sleeves by stitching 42 also assists in stabilizing the free ends of the cage legs. A similar arrangement is employed in a cage having four legs. In such case two sleeves are used, each sleeve covering two legs and the two sleeves crossing and being stitched together at the apex of the cage.

Sleeves 40 and 41 have end portions 45 which underlie portions of the cushion ring sleeve 26 and preferably extend far enough into orifice ring channel 23 to be secured by a portion of winding 28. Sleeves 40 and 41 are additionally secured by a plastic tie down winding 46. Stitching 31 also includes the sleeves 40 and 41 as indicated at 31a.

Protuberances 50 are provided at intervals on the inside of each cage leg 11, 12 and 13. These protuberances project from the leg a distance equal to the double thickness of the sleeve, the threads of the mesh being deflected around the protuberances. Thus the protuberances 50 provide bearing surfaces 51 on the cage legs to protect the sleeves 40 and 41 from wear as the ball reciprocates back and forth in the cage. At the same time the light contact of the cloth between the protuberances with the metal ball serves to deaden the sound of impact as the ball strikes the end of the cage in its opening movement so that the valve is not objectionably noisy in operation.

Bearing surfaces 51 are curved to conform to the surface of the ball as shown in FIG. 2.

Figure 6:
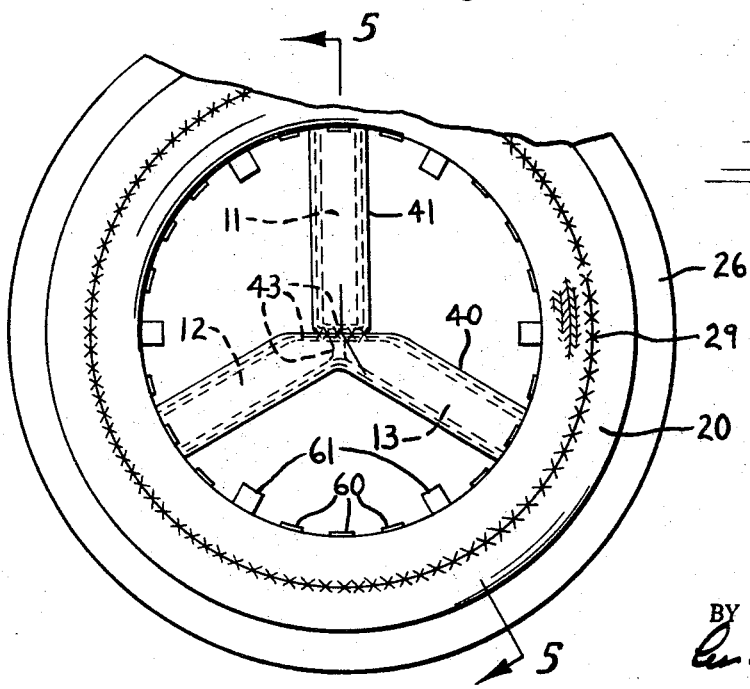
FIG. 6 is a view of the inflow end of the valve in FIG. 5 with the ball removed.

The valve shown in FIGS. 5 and 6 has an orifice diameter very slightly larger than the ball diameter. This is the largest possible orifice for a ball valve. This construction is similar to that just described except that the orifice ring 10a is equipped with two sets of integral protuberances 60 and 61 disposed in axially spaced planes. Protuberances 61 are closer to the inflow face of the ring and project inwardly of the ring a distance considerably greater than the thickness of sleeve 20. These protuberances form ball stops which limit the excursion of the ball in its closing movement. These stops engage the ball in a circular contact zone which has the same relative position on the ball as the circular contact zone of protuberances 35 in FIG. 1, this contact zone being spaced from a diametral plane through the ball.

Protuberances 60 are in the diametral plane of the ball when the ball is seated on stops 61. The ball has slight clearance within the ring of protuberances 60 and cloth 20 which allows a controlled and minimal amount of leakage when the valve is closed. The protuberances 60 are merely cloth protectors to prevent wearing pressure contact between the ball and sleeve 20. As described in connection with FIG. 1, the mesh of the knitting is opened or spread at each protuberance 60 and 61 whereby the protuberances project through the cloth without any threads in the cloth being severed and the cloth maintains its original structural integrity.

Orifice ring 10a in FIG. 5 is of greater axial extent than orifice ring 10 in FIG. 1 but the other features of construction are the same as in the first embodiment as identified by corresponding reference numerals and reference is made to FIGS. 1 to 4 for detailed description of the common features.

The number, shape and dimensions of protuberances 35, 50, 60 and 61 may vary depending upon design calculations.

Having now described my invention and in what manner the same may be used, what I claim as new and desire to protect by Letters Patent is:

1. A heart valve comprising an orifice ring, a valve member movable to open and closed positions relative to said orifice ring, means retaining said valve member in cooperative relationship with said orifice ring, a relatively soft covering on said orifice ring, and protuberances on the valve member contact area of said orifice ring extending through said covering to protect said covering from wear by said valve member.

2. A heart valve as defined in claim 1, said covering being cloth.

3. A heart valve as defined in claim 2, said protuberances extending through the mesh of the cloth without impairing the integrity of the cloth.

4. A heart valve as defined in claim 1, said valve member being metal.

5. A heart valve as defined in claim 1, said valve member being a ball.

6. A heart valve as defined in claim 1, said protuberances having seating surfaces for seating said valve member in closed position, said covering forming a seal against said valve member between said protuberances.

7. A heart valve as defined in claim 1 including stop means arranged to stop the movement of said valve member in closed position, said valve member being of circular configuration and said protuberances being disposed in a diametral plane of said valve member in closed position of the valve member.

8. A heart valve as defined in claim 7, said stop means being connected with said orifice ring.

9. A heart valve as defined in claim 8, said stop means comprising additional protuberances on said orifice ring extending through said covering.

10. A heart valve as defined in claim 1, said retaining means comprising cage legs on said orifice ring, a relatively soft covering on said legs, and protuberances on the valve member contact areas of said legs extending through said covering to protect said covering from wear by said valve member.

11. A heart valve as defined in claim 10, said cage legs forming a cage with an open apex.

12. A heart valve as defined in claim 11, said last covering comprising sleeves on said legs.

13. A heart valve as defined in claim 12, said sleeves being cloth.

14. A heart valve as defined in claim 12, said sleeves closing said open apex and being connected to each other at said apex.

15. A heart valve as defined is claim 1, said retaining means comprising cage legs on said orifice ring forming an open apex cage, interfitting surfaces on the ends of said cage legs at said apex shaped to bear against each other and stabilize said legs, and sleeves of relatively soft flexible material on said legs connected together at said apex to assist in stabilizing said legs.

16. A heart valve comprising an orifice ring, a valve member movable to open and closed positions relative to said orifice ring, a cage on said ring retaining said valve member, a cloth covering on said ring and cage, and protuberances on the valve member contact areas of said ring and cage extending through said covering to protect said cloth from wear by said valve member.

References Cited

UNITED STATES PATENTS

| | | | |
|---|---|---|---|
| 3,263,239 | 8/1966 | Edwards et al. | 3—1 |
| 3,466,671 | 9/1969 | Siposs | 3—1 |

OTHER REFERENCES

"Clinical Experience with a Ball Valve Prosthesis," by A. Starr et al., The Bulletin of the Dow Corning Center for Aid to Medical Research, vol. 4, No. 2, April 1962, p. 7.

"Prosthetic Replacement of the Mitral Valve," The Lancet, November 1962, p. 1087.

"Design of Heart Valves," by T. B. Davey et al., Mechanical Engineering, vol. 88, No. 7, July 1966, pp. 22–26.

"Thrombus Resistant Rigid Prosthetic Heart Valves Covered with Porous Synthetic Fabric," by L. Bonchek et al., Trans. Amer. Soc. Artif. Int. Organs, vol. XIII, June 16, 1967, pp. 101–104.

RICHARD A. GAUDET, Primary Examiner

R. L. FRINKS, Assistant Examiner

U.S. Cl. X.R.

137—513.5, 533.11, 533.19

UNITED STATES PATENT OFFICE
CERTIFICATE OF CORRECTION

Patent No. 3,534,410　　　　　　　　　Dated  October 20, 1970

Inventor(s)  Donald A. Raible

It is certified that error appears in the above-identified patent and that said Letters Patent are hereby corrected as shown below:

In the heading to the printed specification, lines 5 to 7, "assignor to Edwards Laboratories, Inc., Santa Ana, Calif., a corporation of California" should read -- assignor, by mesne assignments, to American Hospital Supply Corporation, Evanston, Ill., a corporation of Illinois --.

SIGNED AND SEALED
FEB 9 1971

(SEAL)
Attest:

Edward M. Fletcher, Jr.
Attesting Officer

WILLIAM E. SCHUYLER, JR.
Commissioner of Patents